United States Patent [19]
Miller

[11] 3,726,544
[45] Apr. 10, 1973

[54] SNAP-OFF MUD FLAPS

[76] Inventor: James F. Miller, 3664 Stettinius Avenue, Cincinnati, Ohio 45208

[22] Filed: June 23, 1971

[21] Appl. No.: 155,889

[52] U.S. Cl. ........................................... 280/154.5 R
[51] Int. Cl. .............................................. B62d 25/16
[58] Field of Search .............................. 280/154.5 R

[56] References Cited

UNITED STATES PATENTS

| | | | |
|---|---|---|---|
| 3,219,363 | 11/1965 | Dalsey | 280/154.5 R |
| 2,777,710 | 1/1957 | Panchesine | 280/154.5 R |
| 3,650,543 | 3/1972 | Evans | 280/154.5 R |
| 3,158,386 | 11/1964 | Tillingshast | 280/154.5 R |
| 3,333,868 | 8/1967 | Sogoian | 280/154.5 R |
| 3,549,171 | 12/1970 | Katz | 280/154.5 R |

*Primary Examiner*—Kenneth H. Betts
*Assistant Examiner*—Robert R. Song
*Attorney*—Walter S. Murray

[57] ABSTRACT

A mud flap for trucking trailers and other wheeled vehicles comprising a releasable connector means between the truck body mounting member and that part of the flap liable to be accidentally caught between the wheels of the vehicle moving in reverse, and a stationary object, such as curbing which otherwise tear or mutilate the mud flap and its mounting.

5 Claims, 7 Drawing Figures

PATENTED APR 10 1973 3,726,544
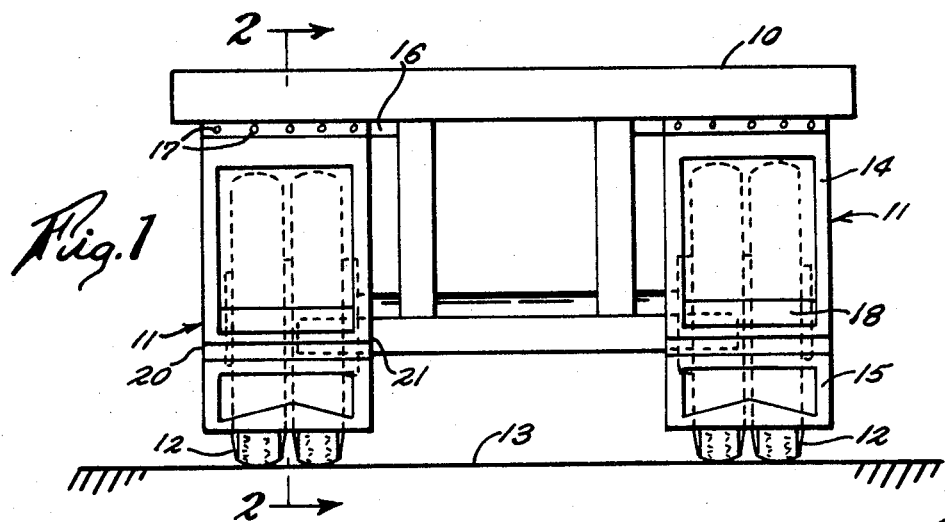
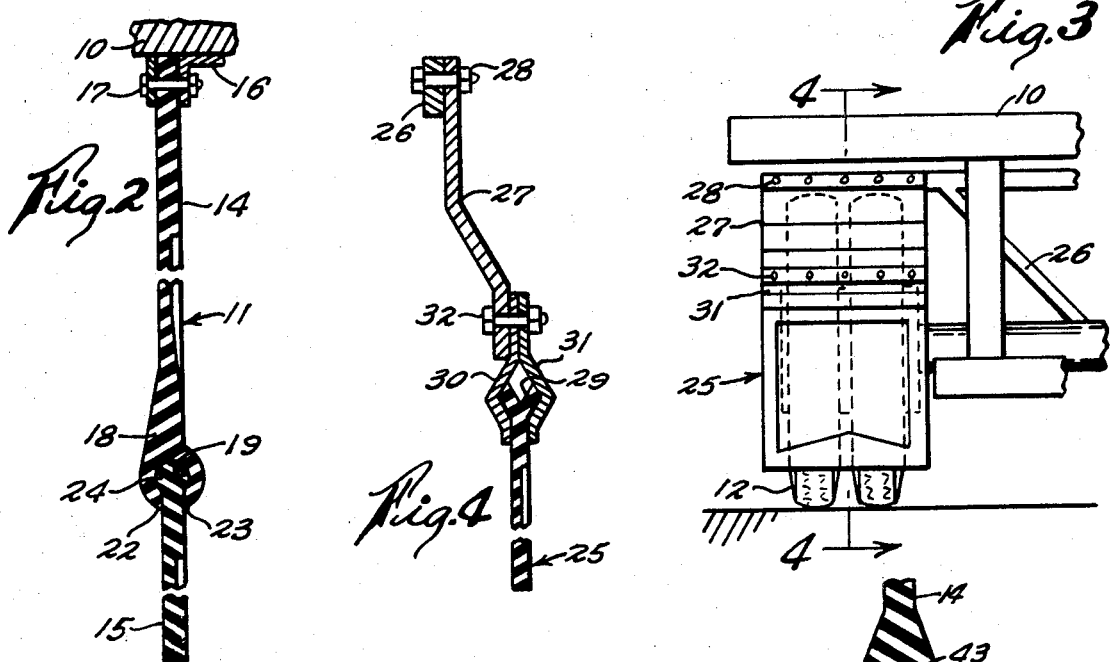
INVENTOR
James F. Miller
BY [signature]
ATTY.

SNAP-OFF MUD FLAPS

The present invention relates to mud flaps for over-the-road vehicles, especially trucking trailers, and is particularly directed to an improved mud flap construction that will add a longer useful life to these expendable devices that are subjected to much wear-and-tear.

Operators of trucking trailers, and like vehicles, must comply with State laws requiring that trailers be equipped with mud flaps extending downwardly behind the wheels a stated and relatively close distance from the roadway, sometime within 3 inches from the road, to prevent the splash of mud, water or the throwing of stones and gravel into the windshields of vehicles following the trailers. However, these trailers are frequently backed into positions at loading docks, curbs, and the like obstacles, where the flaps are caught between said objects and the rotating rear wheels which either tear the flaps from their mountings or the flaps are so mutilated that they must be replaced; both conditions causing a substantial and continuing financial loss to the operators.

It is therefore the general purpose of this invention to provide for truck trailers, and like vehicles, a separable mud flap structure which when accidentally caught between stationary objects and the wheels of a moving trailer will readily part at a predetermined connector and provide means to reassemble the flap without any loss of that flap to the operator.

A further object of the invention is to provide a snap-off mud flap that is easy to reassemble after accidental separation, is rugged and substantially fool-proof in use, and which will require very little replacement.

Other objects of the invention will become apparent from the following specification taken in conjunction with the accompanying drawings wherein:

FIG. 1 is a rear elevational view of a trucking trailer with the snap-off mud flap of this invention positioned thereon.

FIG. 2 is an enlarged, fragmental section taken on line 2—2 of FIG. 1.

FIG. 3 is a fragmental, rear elevational view of a trucking trailer having sliding tandems with a modified form of this invention positioned thereon.

FIG. 4 is a fragmental, enlarged section taken on line 4—4 of FIG. 3.

FIG. 5 is an elevational view of a modified form of my snap-off mud flap.

FIG. 6 is an enlarged, fragmental section taken on line 6—6 of FIG. 5.

FIG. 7 is an enlarged section showing a further modified form of my separable connector for a two-part mud flap.

With particular reference to FIGS. 1 and 2 of the drawings the numeral 10 indicates the body of a flat bed trucking trailer, generally called in the trade a "West Coast" trailer. Mud flaps 11—11 are mounted on the body 10 behind the trailer wheels 12—12 and it will be noted that said flaps extend downwardly from the body to within a relatively short distance from the roadway 13; some state laws specifying that said distance be not more than 3 inches. As best shown in FIG. 2 each mud flap 11 has a mounting member 14 and a flap part 15, each part having a relatively thin, flexible body preferably constructed from a composition of nylon cord and rubber. The upper flap part 14 has its top margin fastened to a trailer body member 16 by a line of bolts 17 while its lower end portion is thickened at 18 and provided with a downwardly opening slot 19.

The slot is preferably circular in section (FIG. 2) and has a uniform diameter throughout its longitudinal extent, said slot opening out into the end edges 20 and 21 of the flap. The slot is formed with a restricted opening which provides confronting lips 22 and 23 which have relative resiliency because of their attenuation in the flap body. The lower flap part 15 has a rib 24 formed on its upper end which is cylindrical in section and is normally, snugly received and held in the slot 19 in the upper flap part 14 to provide a releasable connection for the flap parts in the form of a dovetail joint.

To connect the flap parts 14 and 15 together it is only necessary to slide the rib 24 endwise into the slot 19 to form a releasable connector means between the flap parts 14 and 15 and then to mount the the flap 14 by the bolts 17 to the trailer body. In the event undue downward tension is placed on the lower flap part 15, as when the trailer backs up against curbing, or the like, thereby catching the flap part 15 between the curb and the wheels 12, the lower part will release from the upper part at the connection without damage to either flap part and the parts can then be reassembled for continued effective use.

Now with reference to FIGS. 3 and 4 of the drawings there is depicted a tandem type trailer body wherein the trailer wheels 12 may be adjusted longitudinally of the trailer body 10 and wherein a modified mud flap 25 is positioned on the trailer chassis 26. In this modification a mounting member in the form of a fender plate 27 is fixed by a line of bolts 28 to the frame 26 and extends downwardly and rearwardly of the frame and behind the wheels 12. The mud flap 25 is provided at its upper end with a rib 29 that is Y-shaped in section and which is embraced between a dovetail joint formed by two bracket members 30 and 31 that are secured to the lower edge portion of the fender plate 27 by a line of bolts 32. When undue tension is placed on the flap the legs of the Y-shaped rib 29 will collapse inwardly permitting the flap to be snapped out of the bracket members without damage to the flap. The rib of the flap may be slid endwise into the bracket members to reassemble the flap for continued usage after such accidental release action.

FIGS. 5 and 6 depict a further modification of the invention wherein the numeral 33 is a trailer body mounted member provided at its lower end with a cylindrically shaped groove 34 which opens out into the side edges 35 and 36 of the member, said groove opening downwardly through a restricted mouth 37 formed in the member. A flap 38 is provided at its upper end with a hollow cylindrical rib 39 which is normally engaged and held in the groove 34 but when undue tension is placed on the flap the rib will collapse and pass through the mouth 37 to thus preclude injury and damage to the flap. A detent 40 is formed centrally of the rib 39 and extends upwardly therefrom into a recess 41 formed in the wall of the groove 34 to provide a means precluding endwise movement of the flap in the mounting member.

FIG. 7 shows a further modification of my invention wherein the releasable connector for the two-part flap 11 shown in FIGS. 1 and 2 is provided with a means for precluding longitudinal displacement of the parts in use, said means being similar to that shown in FIGS. 5 and 6 of the drawings wherein a lug 42 is formed on the rib 24 and projects into a hole 43 formed in the slot of the mounting member 14.

Having thus described my invention what I claim is:

1. A two-part mud flap structure for placement behind the rear wheels of trucking trailers, or the like, said flap comprising an upper flap part made of resilient rubber material, mounting means on the upper end of said flap part adapted to fasten said part to the trailer, a longitudinal dovetail slot formed in the lower portion of the upper flap part and having a restricted mouth opening out into the lower edge of said part, said lower edge of said upper flap having two lips confronting each other across the said restricted mouth, a lower flap part having a longitudinal rib formed on its upper edge receivable in the slot in the upper flap part and depending downwardly from between the two lips, and said two lips forming means for resiliently releasably holding said rib in said slot, permitting separation of the flap parts without damage to said parts when undue tension is accidentally exerted downwardly on the lower flap part.

2. The two-part flap structure set forth in claim 1 wherein the bottom flap part is substantially shorter than the upper flap part.

3. The two-part flap structure set forth in claim 1 wherein both parts have relatively thin, flexible bodies.

4. The two-part flap structure set forth in claim 3 wherein each part is constructed from a nylon cord and rubber composition.

5. The two-part flap structure set forth in claim 3 wherein the lower portion of the upper flap part is thickened and the lips are attenuated and adapted to release the rib on the lower flap part when undue tension is exerted on said lower flap part.

* * * * *